Patented June 19, 1951

2,557,871

UNITED STATES PATENT OFFICE 2,557,871

COMMINUTED COLLAGEN PRODUCT

Vernon L. Harnack, Munster, Ind., and Winthrop F. Bronson, Chicago, Ill., assignors to Wilson & Co., Inc., a corporation of Delaware No Drawing. Application November 22, 1946, Serial No. 711,820

2 Claims. (Cl. 99—130)

This invention relates to a new and useful comminuted collagen product obtained from glue or gelatin stock, which can be converted readily to gelatin by cooking at relatively low temperatures, and to the method of making the same.

By the term glue or gelatin stock as used herein we mean glue- or gelatin-yielding materials such as hides, pork skins, sinews, bones and the like. For convenience, we shall hereinafter refer only to "gelatin stock," for gelatin stock and glue stock are identical insofar as the present invention is concerned.

Gelatin has long been used in the manufacture of many kinds of food products, for example, as a jelling agent in gelatin desserts and as a stabilizer and emulsifier in ice cream. In the confectionery industry it is used in the manufacture of marshmallows, creams, kisses, gum drops, pastes and fondants of many kinds. In the baking industry gelatin is used in making jellies, icings, meringues, and fillings. And in the canning of meats, gelatin is added to absorb and gelatinize meat juices in the canned product. It is also used in coating meat products such as hams, luncheon meats, head cheese, products cooked in natural casings and the like. Another use is found in the manufacture of gelatin capsules.

In the conventional processes for manufacturing gelatin, gelatin stock is subjected to a plumping or curing process which consists of immersing the gelatin stock in a lime or acid bath. In some cases the stock is treated in both a lime bath and an acid bath. The curing or the plumping process used, as well as the immersion time and bath temperature, depends on the type of gelatin stock used, and the intended use of the finished product. When the gelatin stock consists of bones, these are treated, prior to curing or plumping, with fat solvents to extract the fat, and the fat-free bone is crushed or ground to the desired size, say about ⅛ inch to ¾ inch. The mineral matter is then extracted from the comminuted bones by an acid treatment.

After curing or plumping, the stock is washed to remove excess acid, salts and other foreign matter, and the pH of the stock is then adjusted to the desired cooking pH, as by the addition of an acid, organic or inorganic, for example. The stock is then transferred to cooking vessels, water is added, and the mixture is cooked to "cook out" the gelatin. The cooking pH for bones is ordinarily between about 5.0 to 7.0; for pork skins about 3.5 to 4.5; and for calf skins and sinews about 5.2 to 7.0. In general, the cooking pH for cured or plumped gelatin stock may vary from about 3.0 to 8.5.

The "cooking-out" of the treated gelatin stock takes place in several stages, ordinarily in from 4 to 7 stages. The first "cook-out" is accomplished by cooking the treated gelatin stock at a low temperature for a short period of time, ordinarily at a temperature of between about 120°–150° F. for about 3 to 5 hours. The gelatinous liquor formed is removed and filtered and evaporated to a solids content of about 10 to 25%. The resulting gelatin is then dried and may be ground. Subsequent "cook-outs" are accomplished by progressively increasing the cooking time and temperature before drawing off the gelatinous liquor. This process of successive extractions at increasing temperatures is continued with the last extraction being cooked at boiling temperature.

The gel strength of gelatin decreases markedly as the cooking time and temperature are increased. For example the gelatin obtained from the first "cook-out" may have a gel strength of about 300, as measured on the Bloom gelometer, while subsequent "cook-outs" yield gelatins whose gel strength may be as low as 50.

Many attempts have been made, throughout the industry, to increase the yield of high Bloom gelatin from a given amount of gelatin stock, but these attempts have not met with real success.

In accordance with the present invention we obtain a high yield of high gel-strength gelatin from gelatin stock by treating gelatin stock as hereinafter described to provide a novel, dry to the touch, comminuted collagen having the characteristic of readily yielding a large amount of high gel-strength gelatin when cooked for a short period of time at a relatively low temperature. By operating in accordance with our invention we can obtain from our dry comminuted collagen in a single "cook-out" carried out at a temperature of about 140° to 160° F. for about ¼ to 1 hour, a yield of gelatin comparable to that obtained by five or more "cook-outs" in accordance with conventional procedures, of a Bloom strength of about 225 to 300 and even higher.

Apart from its property of yielding readily a high gel-strength gelatin, the dry comminuted collagen product of the present invention is itself capable of use in lieu of gelatin in making gelatinous food products. Thus the dry comminuted collagen product of the present invention, when added to a conventional ice cream mix in lieu of gelatin, imparts to the mix an increased stabilizing action and the mix whips faster to the desired overrun than an ordinary gelatin. Additionally, our novel collagen product is as effective in stabilizing ice cream as 300 Bloom gelatin, on a weight for weight basis. In other gelatinous products such as puddings, for example, the addition of the comminuted collagen product of the present invention to a pudding mix imparts to the mix a smoother texture and better body than is obtained from pudding mixes made with conventional commercial gelatin.

The dry comminuted collagen of the present invention may be prepared as follows. In general, we proceed with the treatment of gelatin stock as in making gelatin by the conventional processes, up to that step in the process in which the cured or plumped gelatin stock, of the desired pH between about 3.0 and 8.5, is to be cooked. The preferred pH for bones, calf stock and sinews is between 5.5 and 7.0, and for pork skins it is between about 3.7 and 4.5

In accordance with the present invention the cured or plumped gelatin stock of the desired pH between about 3.0 and 8.5, preferably between about 5.5 and 7.5, is dried to a moisture content of no more than about 16 to 18% by weight, preferably below about 12% by weight, and the dried, cured stock is then comminuted, as by attrition in a roller mill, hammer mill, or the like. The drying of the cured gelatin stock is, preferably, carried out to avoid conversion of cured stock to gelatin during the drying operation, since the formation of appreciable amounts of gelatin during any stage of the drying is objectionable. The reason therefor is that gelatin results in causing the particles of cured gelatin stock to adhere one to the other and further causes these particles to stick to the trays, screens, or drying belts used in the dryer. Additionally, the presence of substantial amounts of gelatin during the drying stage increases the tendency of the treated gelatin stock to "case harden" during the final stages of the drying operation when the treated stock is brought down to the desired moisture content.

The cured or plumped gelatin stock which, from practical considerations, constitutes the starting material of the present invention has a moisture content in excess of about 50% by weight, generally in the order of about 70% by weight. We have found that conversion of this cured gelatin stock to gelatin takes place readily at temperatures above about 95°–100° F., in the presence of amounts of water in excess of approximately 50% by weight. Accordingly, in accordance with the preferred aspects of the present invention, the drying operation is so carried out that the temperature of the cured gelatin stock is maintained below approximately 95°–100° F., until the moisture content of the stock is reduced to approximately 50%, preferably below 50%. Thereafter the temperature of the stock may, if desired, be raised to accelerate the removal of the moisture until the moisture content of the stock has been reduced to the desired point. In the second stage of the drying operation, the temperature of the cured gelatin stock undergoing drying may be raised to a temperature of approximately 140° F. or somewhat higher without deleteriously affecting the desired characteristics of the material. It is manifest that drying of the product to the desired point may be effected by maintaining the temperature below about 95°–100° F. throughout the drying step, or somewhat above this temperature providing there is no undue amount of gelatin cooked out during this step.

The temperature of the air, gas or other aeriform body which may be used to effect the drying may, of course, be above the temperature to be obtained in the cured gelatin stock during drying and this temperature may vary to a substantial extent depending upon the relative humidity of the aeriform body, as is well understood.

The drying operation may be carried out by spreading the cured gelatin stock on trays which are stacked on trucks and pushed into drying tunnels or by moving the material on a screen belt or similar device slowly through a drying tunnel, or the material may be dried by other procedures, as desired. When the cured gelatin stock being dried is maintained at a temperature below approximately 100° F. during at least the early stages of the drying operation, the drying time interval is about 16 to 30 hours. In the case of cured gelatin stock obtained from bones and which has a moisture content of approximately 70%, it requires approximately 12 to 16 hours at approximately 100° F. to reduce the moisture content of the stock to below approximately 50%, and approximately 25 to 30 hours at the same temperature to reduce it to below about 16 to 18%. With the aid of vacuum, in either or both drying stages, the drying time is accelerated.

The cured gelatin stock which has been dried to the desired moisture content, as pointed out above, is ground or otherwise comminuted to a particle size no larger than approximately a 20 or 40 mesh, preferably to a mesh finer than a 40 mesh. For example, the preferred material in accordance with the present invention is capable of passing through a 100 mesh screen. During the comminution of the dried cured gelatin stock, the temperature thereof should be kept below approximately 170° F. in order to avoid deterioration thereof.

The comminuted collagen product obtained in accordance with the method of the present invention preferably has a moisture content below about 16 to 18%. The moisture content of the product may be somewhat above this range, depending upon the relative moisture conditions of the air with which it has been or may be in contact, but for all practical purposes the material of the present invention is "dry to the touch." It has a pH of about 3.0 to 8.5, preferably about 5.5 to 7.5, and is capable of being cooked readily to a high gel-strength gelatin at relatively low temperatures and in a short time interval, in the presence or even in the absence of an acid. In general, the comminuted product of the present invention is capable of having substantially all of its gelatin precursor content converted to a high gel-strength gelatin having a Bloom of about 225–300 in a single "cook-out" carried out at approximately 155° F. for approximately one-half hour.

The invention will be more fully understood from the following detailed example of an illustrative method for producing the dry comminuted collagen product of the present invention. It is to be understood that the invention is not to be restricted to the details of this example.

EXAMPLE 1

Dry shin bone which had been ground to pass through a ¾ inch mesh screen and stay on a ⅜ inch mesh screen was treated with 2° Bé. hydrochloric acid in a battery of four tanks, by the counter-current flow of the acid through the tanks for a period of 21 days, to extract the minerals from the dry bone. The resulting ossein was held in milk of lime for 45 days and the material was then washed with water to remove lime particles. The stock was steeped in dilute sulfuric acid (pH of steep approximately 5) until the acid penetrated into the stock. This required 4 days. The stock was then washed in fresh water and the washing was continued until the pH of the gelatin cooked from a sample of the stock was 6.5.

The procedure hereinabove described for demineralizing and curing or plumping of the gelatin stock was in accordance with conventional practice. The cured or plumped gelatin stock thus obtained was divided into two equal portions and marked lot A and lot B.

Lot A was cooked in a manner commonly used in cooking out gelatin, in five "cook-outs." The gelatin-strength of the gelatin obtained from each "cook-out" was measured and the results are given below.

Lot B, with a moisture content of about 70% by weight, was spread on trays and dried for 16 hours at a temperature of 100° F., which was followed by 8 hours of drying at 130° F. The moisture content of the material was reduced to 6.04%. This material was then comminuted in a hammer type mill until the size of the particles was such that they all passed through a 100 mesh screen. During the grinding operation the temperature of the product was in the order of about 140°–160° F.

The resulting comminuted collagen product produced as above described was subjected to a single "cook-out" to extract gelatin. The gel-strength of the gelatin obtained from this "cook-out" is given below along with the cooking conditions for comparison with the cooking conditions of the five "cook-outs" to which lot A was subjected.

|  | Gel Strength | Cooking Time | Cooking Temp. |
|---|---|---|---|
| *Lot A* | | | ° F. |
| 1st cook-out | 285 Bloom | 4 hrs | 140 |
| 2nd cook-out | 222 Bloom | 4 hrs | 155 |
| 3rd cook-out | 179 Bloom | 4 hrs | 170 |
| 4th cook-out | 127 Bloom | 4 hrs | 185 |
| 5th cook-out | 50 Bloom | 10 hrs | 210 |
| *Lot B* | | | |
| One cook-out | 302 Bloom | 30 min | 155 |

The total amount of gelatin obtained in the case of lot B where only one "cook-out" for one-half hour was made, was approximately the same as the total of the five "cook-outs" made in the case of lot A.

The comminuted collagen product produced from bone as described above as well as similar comminuted collagen products produced from the other gelatin stocks may be used in the manufacture of gelatinous food products such as, for example, ice cream, puddings, candies, meat products, jellies, gelatin capsules and the like. In the manufacture of such gelatinous food products, gelatin is dissolved in hot water or other liquid ingredient and is added to the remaining ingredients prior to a heating or cooking step. Or dry gelatin may be added to other dry ingredients, and the mixture is heated or cooked with the desired liquid ingredients.

The comminuted collagen product of the present invention is used in lieu of gelatin in the manufacture of gelatinous food products, in the same manner that gelatin has heretofore been used. During the heating and cooking steps necessary to produce the gelatinous food products with the aid of the comminuted collagen product of the present invention, high yields of gelatin having unusually good jelling properties are formed. In addition, the comminuted collagen product yields mucins and various proteinaceous materials which improve the emulsification of the ingredients and also improve the smoothness and texture of the final products.

The uses of the comminuted collagen product of the present invention as well as the advantages flowing from such uses will be apparent from the following detailed illustrative examples. It is to be understood that the invention is not to be construed as limited to the details of these examples. Nor is the invention to be construed as restricted to the uses illustrated by these examples, for the product of our invention is capable of use in the manufacture of gelatinous food products as well as in the manufacture of capsules and other articles of commerce wherever gelatin has been used heretofore, as pointed out above.

EXAMPLE 2

Batches of ice cream were prepared in accordance with conventional procedure, using the following basic formula:

| | Per cent |
|---|---|
| Butter fat | 12.0 |
| Milk solids not fat | 10.0 |
| Sucrose | 10.0 |
| Cerelose (dextrose) | 6.0 |
| Water | 62.0 |

The dairy products were blended together in a large batch and divided into equal parts and labeled "lot A" and "lot B." Gelatin was mixed thoroughly with the dry sugar and the mixture was stirred into lot A in the pasteurizer when the temperature of the mix had reached approximately 90° F.–100° F. Pasteurization consisted of holding the mix at 155° F. for 30 minutes after the mix had reached this temperature. Following pasteurization the mix was put through a homogenizer at a pressure of 2500 pounds on the first stage and 500 pounds on the second stage. The mix was cooled to 40° F. over a surface cooler and then held at approximately that temperature for 24 hours before freezing.

The ice cream was frozen in a 40 quart direct expansion batch freezer to an overrun of 100%. After drawing from the freezer, a representative sample was held 24 hours in a hardening cabinet at 10° F. below zero, and then scored for body and texture.

Lot B was processed in the identical manner described above in connection with lot A except that the comminuted collagen product of the present invention was used instead of the gelatin.

*Freezing data and score for body and texture*

| Lot No. | Stabilizer | Freezing Time | Drawing Temp. | Score |
|---|---|---|---|---|
| | | Min. | ° F. | |
| A | 0.35% gelatin (275 Bloom) | 8½ | 24.0 | 24 |
| B | 0.35% comminuted collagen | 8 | 23.8 | 23.85 |

The scoring was done on the basis of a maximum of 25.

EXAMPLE 3

Several hams were divided into two equal lots and labeled lot A and lot B. An amount of dry 275 Bloom gelatin equal to 0.25% of the weight of the ham was dispersed over the surface of each ham in lot A. A similar amount of our comminuted collagen was dispersed over the surface of each ham in lot B.

Each ham was then placed in a can, the cans were sealed, heated for two and one-half hours at 165° F., chilled to 45° F., and opened. The jell surrounding the hams in lot B was identical for all practical purposes with that surrounding the hams in lot A.

From the foregoing it is manifest that our invention has many advantages. By practicing it, it is possible to obtain from a given amount of gelatin stock a greater yield of high gel-strength gelatin than heretofore. Another advantage of our invention lies in the fact that we can make gelatin-containing foods without the use of commercial gelatin, by substituting for the gelatin an equal or lesser amount of our dry, comminuted collagen. The gelatin-containing foods so manufactured are at least equal and, in some respects, are even superior to gelatin-containing foods made with commercial gelatin. In such frozen food products as ice-cream, the use of our comminuted collagen results in a product having greater gel-strength and stability than similar products made with commercial gelatin. In addition, the use of our comminuted collagen improves the smoothness, texture and emulsification characteristics of these food products.

Another advantage accruing from the use of our dry comminuted collagen in making gelatin-containing foods is the fact that these food products can be manufactured more economically than by the use of commercial gelatin.

Although we have described specific embodiments of our invention, our invention is not to be construed as limited thereto since it is capable of some variations. Thus, for example, the comminution of the cured and plumped gelatin stock to the desired fine mesh below, say about 40, may be carried out without preliminarily drying the cured stock until it is dry to the touch. Freezing of the cured stock may be necessary, in some instances, to accomplish this. Other variations will readily suggest themselves to skilled workers in the art.

The words "plumping" and "plumped" and, respectively, "curing" and "cured" are used synonymously in this specification.

In the claims the term "dry" is not to be construed as restricted to a material which is completely devoid of moisture, since it is intended by that term to include all materials within the purview of the invention which are dry to the touch.

We claim:

1. The process of making a dry comminuted collagen product which is capable of rapid conversion to gelatine of high strength, which comprises heating a moist, cured gelatine stock having a pH between about 3.0 and 8.5 (as determined on a gelatine solution resulting from the cooking thereof in water) at a temperature below about 100° F., continuing such heating to reduce the moisture content of said stock to below 50%, and continuing the heating at a temperature not above 140° C. to reduce the moisture content below about 16 to 18%, whereby conversion to gelatin to an appreciable extent is avoided, and comminuting the resulting product to pass through a 20 mesh screen.

2. The method of preparing a gelatin constituent in a food product which, during preparation, is subjected to a heat treatment at a temperature of about 155° F. or higher, which comprises incorporating therein prior to such heat treatment a finely divided, collagen product having no appreciable content of converted gelatin and of a particle size no larger than 40 mesh, said collagen product being capable of substantially complete conversion of its gelatin precursor content into gelatin having a gel strength of 225 to 300 Bloom on cooking for ½ hour at 550° F., whereby said collagen product is completely gelatinized during the heat treatment of said food product.

VERNON L. HARNACK.
WINTHROP F. BRONSON.

REFERENCES CITED

The following references are of record in the file of this patent:

UNITED STATES PATENTS

| Number | Name | Date |
|---|---|---|
| 333,964 | Milligan | Jan. 5, 1886 |
| 379,021 | Milligan | Mar. 6, 1888 |
| 748,866 | Hewitt | Jan. 5, 1904 |
| 781,882 | Hunter | Feb. 7, 1905 |
| 2,002,963 | Schade | May 28, 1935 |
| 2,235,202 | Cone | Mar. 18, 1941 |
| 2,311,343 | Gloahec | Feb. 16, 1943 |
| 2,355,032 | Musher | Aug. 1, 1944 |